(12) United States Patent
MacNeille et al.

(10) Patent No.: US 9,513,135 B2
(45) Date of Patent: Dec. 6, 2016

(54) STOCHASTIC RANGE

(71) Applicant: Ford Global Technologies, LLC, Dearborn, MI (US)

(72) Inventors: Perry Robinson MacNeille, Lathrup Village, MI (US); Yimin Liu, Ann Arbor, MI (US); Michael Edward Loftus, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 14/487,340

(22) Filed: Sep. 16, 2014

(65) Prior Publication Data

US 2016/0076899 A1  Mar. 17, 2016

(51) Int. Cl.
G01C 21/34 (2006.01)
G01C 21/36 (2006.01)
G08G 1/0969 (2006.01)

(52) U.S. Cl.
CPC ....... *G01C 21/3469* (2013.01); *G01C 21/3667* (2013.01); *G08G 1/0969* (2013.01)

(58) Field of Classification Search
CPC ... B60K 23/08; B60K 17/3467; B60K 17/344; B60K 17/3465; G01C 21/3469; G01C 21/3617; G01C 21/3448; G01C 21/3697; G01C 21/3682; G01C 21/3415; G01C 21/3492; G01C 21/3605
See application file for complete search history.

(56) References Cited

U.S. PATENT DOCUMENTS

| | | | |
|---|---|---|---|
| 2007/0216521 A1 | 9/2007 | Guensler et al. | |
| 2008/0275643 A1 | 11/2008 | Yaqub et al. | |
| 2011/0178670 A1* | 7/2011 | Perkins | B60K 35/00 701/31.4 |
| 2011/0184642 A1* | 7/2011 | Rotz | G01C 21/3492 701/533 |
| 2013/0218366 A1* | 8/2013 | Fukuda | G06F 17/00 701/1 |
| 2013/0304380 A1 | 11/2013 | MacNeille et al. | |

(Continued)

FOREIGN PATENT DOCUMENTS

CN 102709984 B 4/2014
DE 102009013175 A1 11/2009

OTHER PUBLICATIONS

Kim, et al., Sep. 14, 2004, Department of Industrial and Systems Engineering, Florida International University, "Optimal Vehicle Routing with Real-Time Traffic Information."

*Primary Examiner* — Mussa A Shaawat
*Assistant Examiner* — Abdhesh Jha
(74) *Attorney, Agent, or Firm* — Franklin A. MacKenzie; Brooks Kushman P.C.

(57) ABSTRACT

A system may identify an expected time-of-arrival distribution to a waypoint along a vehicle route, determine energy usage along the route according to a plurality of arrival timing states of a traffic control located at the waypoint given the expected time-of-arrival distribution, and display a map including the vehicle route and range contours indicative of alternative results of arriving at the waypoint at the plurality of arrival states. The system may also determine energy usage along the vehicle route and update an expected available range of the vehicle along the route.

20 Claims, 7 Drawing Sheets

(56) References Cited

U.S. PATENT DOCUMENTS

| | | | | |
|---|---|---|---|---|
| 2014/0107913 A1* | 4/2014 | Vicharelli | ........ | G01C 21/3469 701/123 |
| 2015/0015421 A1* | 1/2015 | Krijger | ............ | G08G 1/0129 340/932 |
| 2015/0057923 A1* | 2/2015 | Han | ............... | G01C 21/3492 701/465 |

* cited by examiner

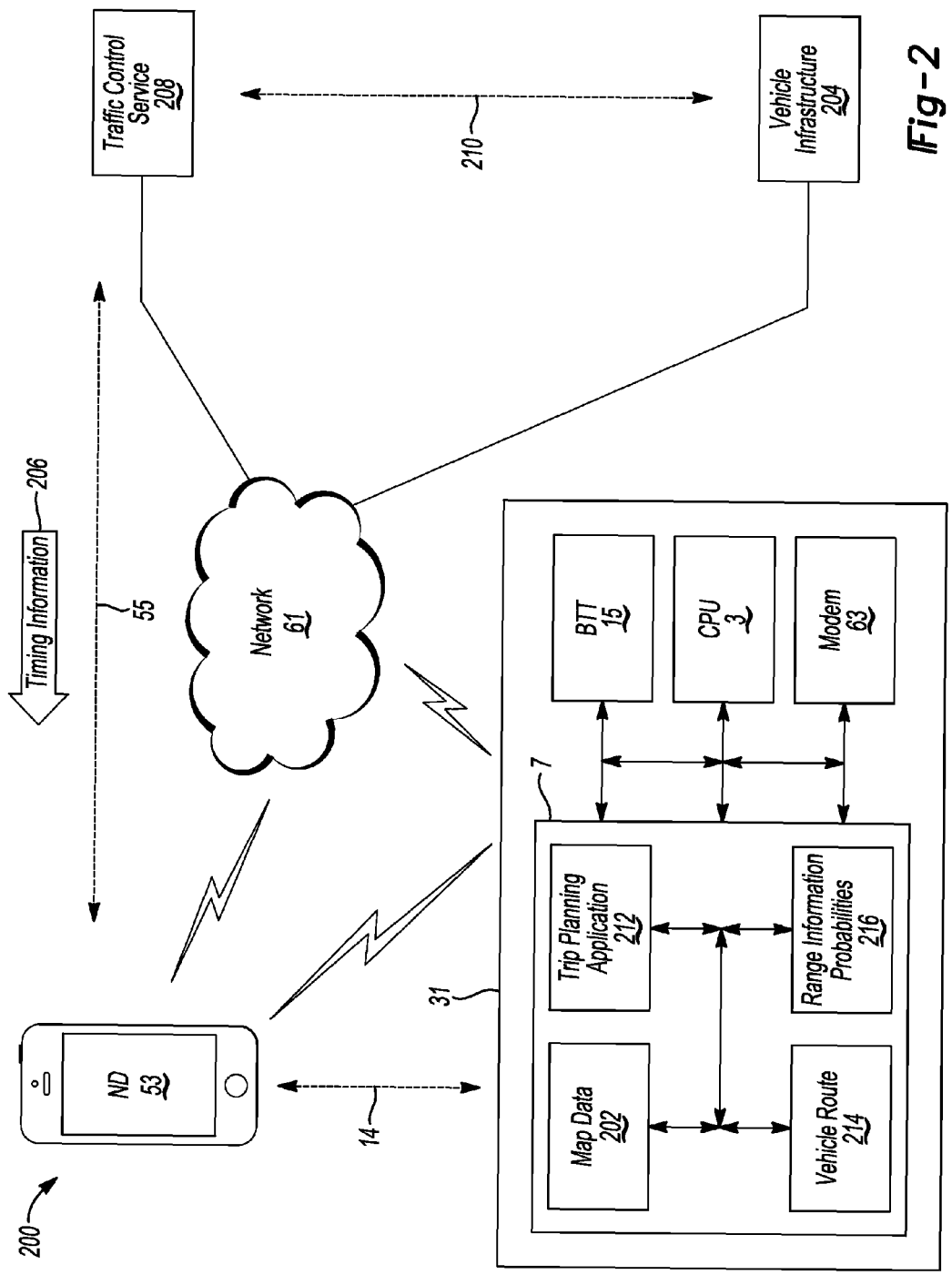

STOCHASTIC RANGE

TECHNICAL FIELD

Aspects of the disclosure generally relate to performing stochastic range calculations utilizing a multi-modal distribution model for range limits.

BACKGROUND

Vehicles may provide information regarding available fuel or distance remaining until refueling is required. Such information may be used by a driver to determine whether or not a destination is reachable without refueling. However, such information may be difficult for a driver to use to determine whether or not a destination may be reachable without refueling.

SUMMARY

In a first illustrative embodiment, a system includes a processor configured to identify an expected time-of-arrival distribution to a waypoint along a vehicle route, determine energy usage along the route according to a plurality of arrival timing states of a traffic control located at the waypoint given the expected time-of-arrival distribution, and display a map including the vehicle route and range contours indicative of alternative results of arriving at the waypoint at the plurality of arrival states.

In a second illustrative embodiment, a system includes a processor configured to compute a probability distribution of a plurality of arrival timing states of a traffic control located at a waypoint along a vehicle route based on an expected time-of-arrival to the waypoint, determine energy usage along the vehicle route according to the probability distribution, expected propulsion energy usage, and expected accessory energy usage of the vehicle, and update an expected available range of the vehicle along the route.

In a third illustrative embodiment, a non-transitory computer-readable medium embodying instructions that, when executed by a processor, are configured to cause the processor to compute a probability distribution of a plurality of arrival timing states of a traffic control located at a waypoint along a vehicle route based on an expected time-of-arrival to the waypoint, determine energy usage along the vehicle route according to the probability distribution, expected propulsion energy usage, and expected accessory energy usage of the vehicle, and at least one of (i) update an expected available range of the vehicle along the route and (ii) display a map including the vehicle route and range contours indicative of alternative results of arriving at the waypoint at the plurality of arrival states.

BRIEF DESCRIPTION OF THE DRAWINGS

FIG. 2 illustrates an example vehicle having a trip planning application and in communication with traffic control service via the network;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A system may utilize stochastic range calculations to identify an amount of time required for a vehicle to reach its intended destination. This determination may be based on timing information indicative of probabilities of discrete traffic control events that affect traffic flow timing. Traffic control events may include, for example, traffic light state probabilities, train schedules, public transit stops, and ability to cross busy traffic patterns or take alternates. The system may be further configured to utilize the time to destination to adjust an expected available range of the vehicle, as time has an effect on state of charge for accessory draw over current conditions and time. The system may accordingly use these adjusted range calculations, for example, for improved charge decision-making.

Figure 1:
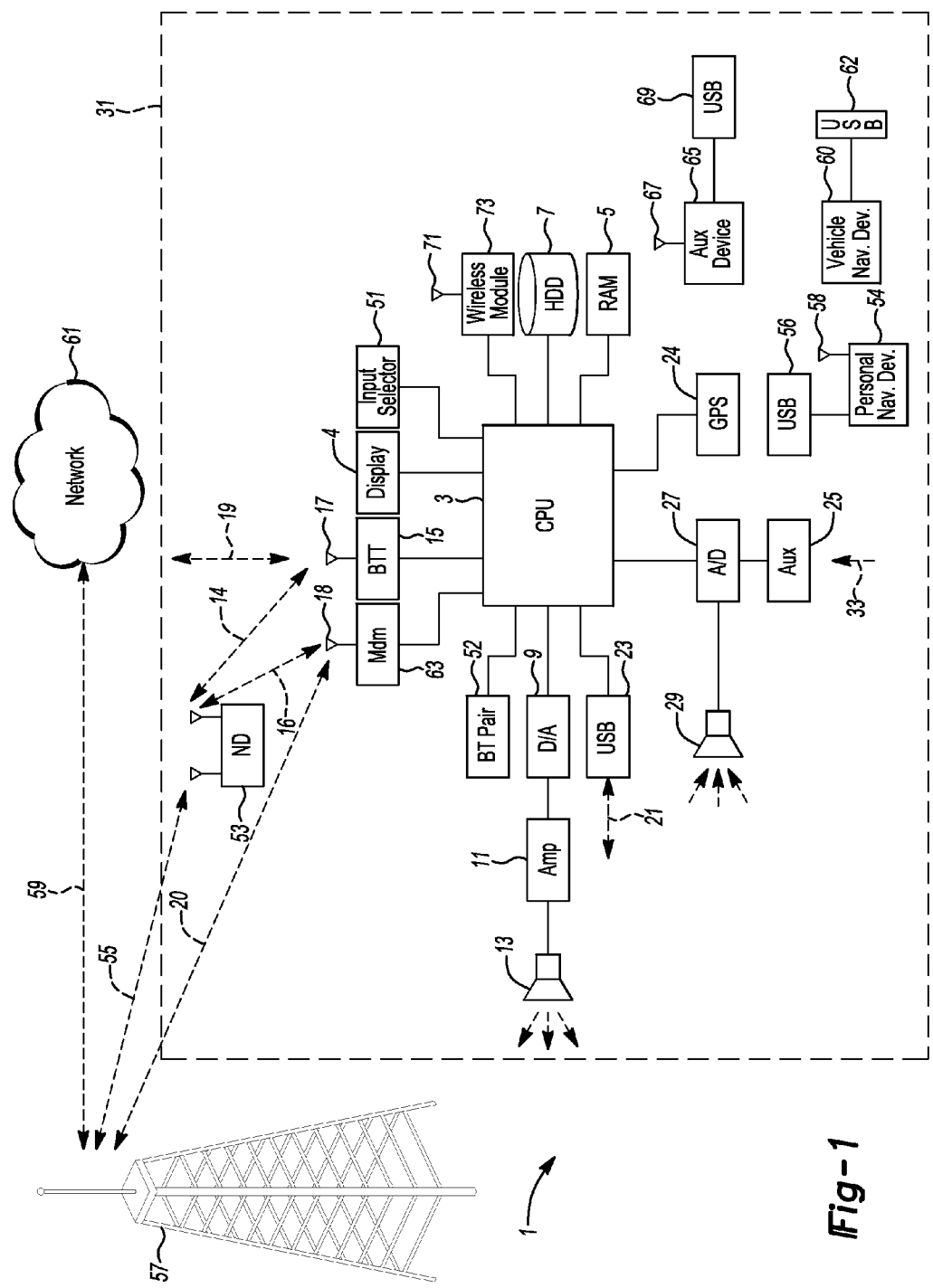
FIG. 1 illustrates an example block topology for a vehicle based computing system for a vehicle.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In some examples, the processor may also be connected to one or more graphics processing units (GPUs) and reconfigurable computing devices such as field programmable gate arrays (FPGAs). In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. As some other examples, the vehicle 31 may communicate with the network 61 through a vehicle-to-infrastructure (V2I) interface such as a dedicated short-range communications (DSRC) network, through a satellite, an automated guided vehicle, a WiFi access point, an free space optical communication device, etc. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. Details of analog simultaneous voice and data (ASVD) may be described in the ITU-T V Series specifications, such as ITU-T V.61. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, wearable computing devices and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

FIG. 2 illustrates an example vehicle 31 having a trip planning application 212 and in communication with traffic control service 208 via the network 61. In an example, the VCS 1 of the vehicle 31 may be connected to a paired nomadic device 53 (e.g. via BLUETOOTH), such that the communications features of the nomadic device 53 may be used to allow the VCS 1 to communicate via the network 61 with the traffic control service 208. In another example, the VCS 1 may communicate with the traffic control service 208 via an onboard modem 63 instead of or in addition to via the nomadic device 53. The traffic control service 208 may be in communication with various vehicle infrastructure 204 over a connection 210, and may be configured to maintain timing information 206 regarding the vehicle infrastructure 204. The VCS 1 may be configured to execute the trip planning application 212 to receive the timing information 206 from the traffic control service 208, and utilize the timing information 206, map data 202, and current vehicle location to determine expected available range information 216 with respect to the vehicle 31. The expected available range information 216 may be used, for example, to improve with VCS 1 charge location decision-making, or to provide information to a driver indicative of available vehicle range.

The map data 202 may include information regarding roads or other paths that may be traversed by the vehicle 31 (e.g., location, name, endpoints, speed limit, traffic, etc.), as well as geographic features of the area surrounding the roadway (e.g., water, parks, desert, mountains, building outlines, etc.). The map data 202 may further include point of interest information regarding possible destinations for the vehicle 31, such as location information (e.g., GPS coordinates, street address, etc.), name information (e.g., business name, names of resident, etc.), as well as other information about the POI (e.g., hours of operation, images of the POI, web, e-mail or other Internet information associated with the POI, goods available at the POI such as a restaurant menu, reviews or rating of the POI, etc.). The vehicle 31 may be configured to maintain the map data 202 in persistent storage 7 of the VCS 1. As one example, the vehicle 31 may load the map data 202, as needed, off a DVD.

As another example, the vehicle 31 may maintain the map data 202 on flash or HDD storage. As one possibility, the map data 202 may be queried to provide navigation information to a viewer of a display.

The vehicle infrastructure 204 may include various types of traffic controls or other equipment capable of providing state information regarding vehicle traversal along roads or other vehicle traversable segments of the map data 202. As some non-limiting examples, the vehicle infrastructure 204 may include traffic lights, train crossings, and drawbridges.

The timing information 206 may include information regarding when various roads or other vehicle traversable segments of the map data 202 may be available for entry by the vehicle 31. As some non-limiting examples, the timing information 206 may include signal light timing, drawbridge timing, train crossing timing, and airport flight schedules. The timing information 206 may further include information regarding overrides or other dynamic changes to the timing information 206, such as information indicatives of alterations to light timing temporarily performed to facilitate priority of passage of emergency vehicles.

In some cases, traffic controls such as signal lights may be on a fixed timing. In such a case, the timing information 206 may be indicative of the fixed timing. It should be noted that fixed timing information may include patterns that change during the day, such as between a predefined daytime pattern and a predefined nighttime pattern. If the vehicle 31 is likely to arrive near the time of a pattern change, there is a statistical component to what the timing state will be in when the vehicle 31 arrives. If random events conspire to make the vehicle 31 arrive slightly past the signal light schedule change, then the timing and energy consumption may be quite different than if the vehicle 31 arrives slightly before.

In other cases, the timing information 206 may be dynamic, and may adjust according to infrastructure-based sensors, such as traffic camera or in-road loops configured to detect traffic, that provide information regarding detected traffic. In these cases, the timing information 206 may depend on random factors such as a vehicle collision or pseudo-random conditions such as a stalled car that theoretically could be predicted if all the information were available. Events of the latter type are considered random for routing purposes although they are formally predictable events.

Some traffic controls, such as stop signs, may not provide explicit timing information 206, and may accordingly lead to relatively unpredictable delays. For instance, a vehicle 31 waiting to turn left onto a busy through-street may wait an unknown amount of time for all traffic to clear. In some cases, the vehicles 31 may be configured to measure their respective wait times at geographic locations, such as stop signs and other non-reporting traffic controls, and generate timing information 206 that may be provided by the vehicles 31 for use by the system 200. Moreover, in some cases saturation of an intersection with traffic, i.e., where vehicles 31 in a queue behind a red light are not able to clear the intersection in a single green light phase, may reduce the predictive value of timing information 206. Saturation may occur in one or more directions or flows at a traffic control or intersection, and may be estimated based on traffic congestion information.

The traffic control service 208 may be configured to receive the timing information 206 from the vehicle infrastructure 204. In an example, the traffic control service 208 may be configured to receive timing information 206 from the vehicle infrastructure 204 over a network connection 210 between the traffic control service 208 and the vehicle infrastructure 204. In other cases, the traffic control service 208 may receive timing information 206 from other sources, such as from the vehicles 31 or via input to the traffic control service 208 from a central traffic authority system from which signal timings are controlled or monitored remotely, allowing for more complex timing patterns between lights. As another possibility, the traffic control service 208 may receive data about the location and routes of trains and ships comes from a centralized traffic control that monitors train and/or ship locations, and/or when the trains or ships are expect to make a crossing, signal lights, track change, or perform some other timing event. As yet a further possibility, the traffic control service 208 may be configured to collect, monitor, or otherwise make available (e.g., via a connection to a real-time traffic service) traffic congestion information regarding the traffic controls or potential routes traversable by the vehicles 31. In some examples, the traffic control service 208 and the vehicle infrastructure 204 may generally maintain network connections 210 to receive updated timing information 206, while in other cases, the traffic control service 208 and the vehicle infrastructure 204 may form temporary network connections 210 to communicate updated timing information 206, such as on a periodic or polled basis.

The traffic control service 208 may be further configured to maintain a data store of the received timing information 206. Using the data store of timing information 206, the traffic control service 208 may facilitate querying of the timing information 206 according to criteria such as vehicle 31 location (e.g., within a distance from the current GPS coordinates of the vehicle 31, within a zip code in which the vehicle 31 is currently located, etc.) and time (e.g., when the vehicle 31 is expected to be in the vicinity of the vehicle infrastructure 204. Responsive to the received queries, the traffic control service 208 may be configured to determine which timing information 206 matches the received criteria, and respond to the query with the located timing information 206.

The trip planning application 212 may be configured to display the map data 202 via the HMI of the vehicle 31 (e.g., via display 4, a display of the instrument cluster, a display of the nomadic device 53, etc.). When displayed, the trip planning application 212 may be configured to illustrate the map data 202 for an area surrounding the vehicle 31, as well as a representation of the vehicle 31 on the map at the current vehicle 31 location.

The trip planning application 212 may be further configured to perform range computations for the vehicle 31. To compute the range of the vehicle 31, the predicted energy consumption and the amount of energy stored on the vehicle 31 may be required. In an example of a battery electric vehicle 31, the range may be estimated by an equation such as Energy=SOH*SOC*Capacity, where SOH is a scaling factor indicative of the state of health of the battery, SOC is the current state of charge of the battery, and Capacity is the original battery capacity. In an example of a gasoline or diesel vehicle 31, the stored energy may be given by an equation such as Energy=EOC*FL*Capacity, where EOC=Energy of combustion, FL=fuel level, and Capacity=capacity of the tank. There are signals on the vehicle bus for SOH, SOC, EOC, FL and Capacity. These signals may be retrieved from the vehicle bus as an input to the trip planning application 212.

The trip planning application 212 may be further configured to utilize the map data 202 to identify routes 214 for the vehicle 31. As an example, the trip planning application 212 may be configured to identify a path along the road segments of the map data 202 from a current vehicle 31 location to a location of a POI the driver wishes to reach. The trip planning application 212 may be further configured to display the route 214 in the HMI of the vehicle 31, such as by way of a highlighted path on the displayed map data 202, or as a listing of one or more driving instructions that, when followed, take the vehicle 31 the intended destination or waypoint POI.

The trip planning application 212 may be further configured to query the traffic control service 208 for timing information 206, and utilize the received timing information 206 to perform stochastic range calculations utilizing a multi-modal distribution model for vehicle 31 range limits to determine range information probabilities 216. The range information probabilities 216 may include, for example, information regarding the likelihood of the vehicle 31 reaching a destination waypoint along a route 214. Further details of the operation of the trip planning application 212 are discussed in detail below with respect to FIGS. 3-9.

Figure 3A:
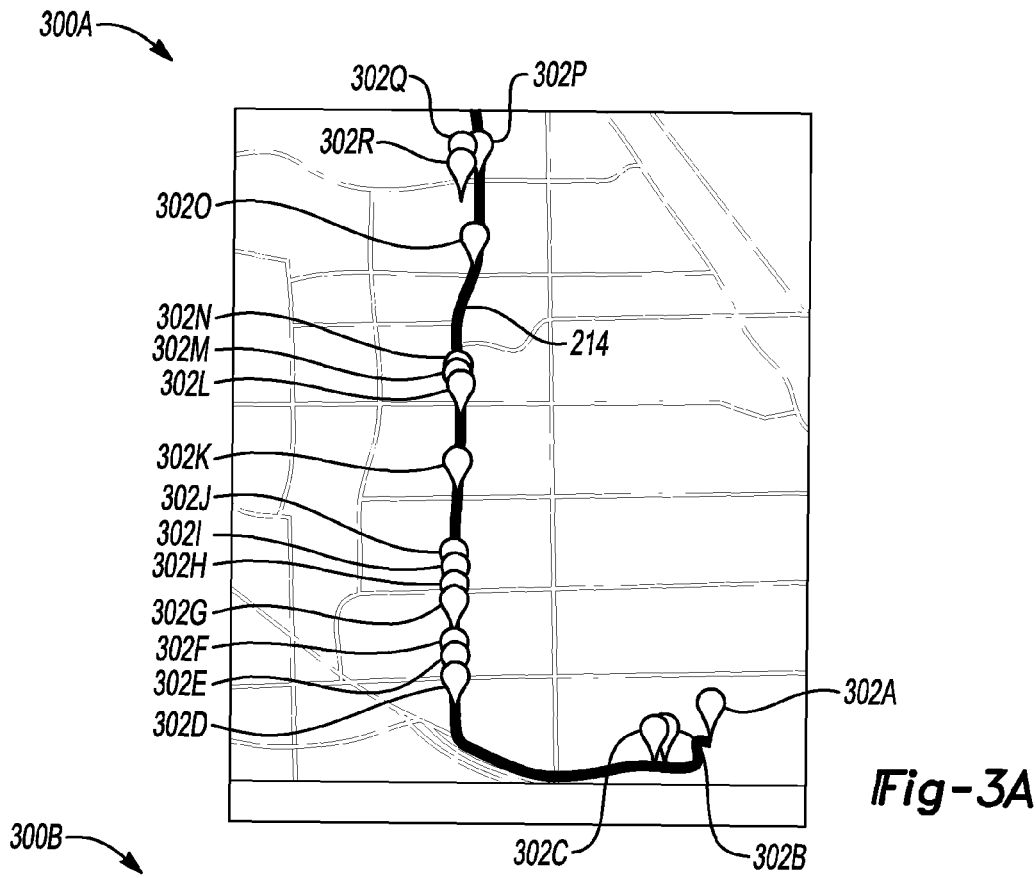
FIG. 3A illustrates a map showing a route that may be traversed by the vehicle having the trip planning application.

FIG. 3A illustrates a map 300 showing a route 214 that may be traversed by the vehicle 31 having the trip planning application 212. The route 214 may refer to a directed path taken by the vehicle 31 from a starting location to a destination location. The route 214 may accordingly include a plurality of waypoints 302, where each waypoint 302 represents a point in physical space. As some possibilities, waypoints 302 may be represented by latitude and longitude, Universal Transverse Mercator (UTM) and Universal Polar Stereographic (UPS) coordinate systems, or other geodetic coordinate system, an identifier of an element of vehicle infrastructure 204, names of intersecting roads, etc. As illustrated, the route 214 includes a plurality of waypoints 302 from a start waypoint 302-A to a destination waypoint 302-R, including intermediate waypoints 302-B through 204-Q.

Figure 3B:
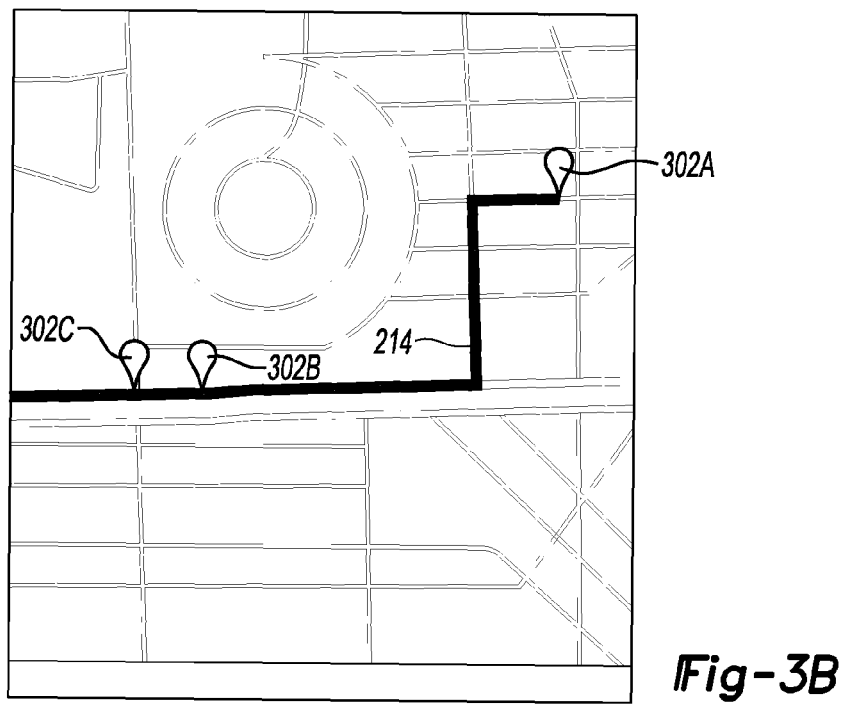
FIG. 3B illustrates further details of the initial waypoints of the example route.

FIG. 3B illustrates further details of the initial waypoints 302 of the example route 214. As illustrated, it can be seen more clearly that waypoint 302-A is the starting location of the route 214, waypoint 302-B is a traffic control element of vehicle infrastructure 204, and waypoint 302-C is also a traffic control element of vehicle infrastructure 204. Due to the timing of the vehicle infrastructure 204, the expected time-of-arrival to the waypoint 302-R from the waypoint 302-A may depend on start time for the vehicle 31, the distance to travel, and also on the timing information 206 for the traffic control elements of vehicle infrastructure 204 along the route 214.

Figure 4:
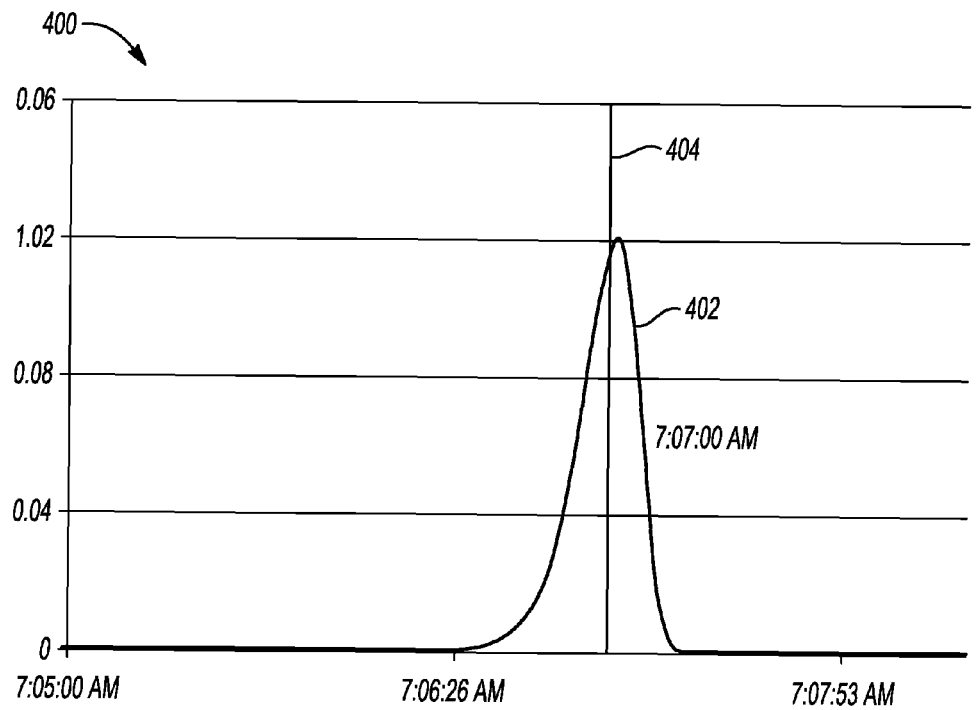
FIG. 4 illustrates an example segment probability distribution for arrival time to the second waypoint of the example route.

FIG. 4 illustrates an example segment probability distribution 400 for arrival time to the second waypoint 302-B of the example route 214. When the vehicle 31 begins to traverse the route 214, the trip planning application 212 may be configured to compute an estimated time-of-arrival distribution 402 from the first waypoint 302-A to the second waypoint 302-B of the route 214. This determination may be based on factors such as: the time at which the vehicle 31 begins the route 214, speed limits and travel distances along roads to the second waypoint 302-B (e.g., as determined based on the map data 202), and historical times taken to reach the second waypoint 302-B from the start waypoint 302-A.

In an example, the vehicle 31 may begin a route 214 on a road at a randomly distributed time close to an expected departure time at the starting waypoint 302-A, and may travel for a variable amount of time to the traffic control of the second waypoint 302-B. The time-of-arrival distribution 402 may be estimated based on the random time distribution for the vehicle estimated by the trip planning application 212 (e.g., estimated as a Weibull distribution, based on historical vehicle 31 arrival times to the waypoint 302-B, etc.). If the vehicle 31 arrives when the traffic control permits the vehicle 31 to proceed (e.g., at a green light as indicated by arrival of the vehicle 31 before traffic control state change indication 404) there is typically no delay (except for left turns), but if the traffic control does not permit the vehicle 31 to proceed (e.g., a red light as indicated by arrival of the vehicle 31 after the traffic control state change indication 404) then the vehicle 31 is delayed such that its arrival at the third waypoint 302-C is determined by its departure from the second waypoint 302-B when the traffic control again allows the vehicle 31 to proceed.

When the trip planning application 212 receives an indication that the vehicle 31 is to travel the route 214 from the waypoint 302-A to the waypoint 214-R (e.g., putting the vehicle into gear, selecting a navigate-to-destination function from the trip planning application 212, etc.), the trip planning application 212 may determine a stochastic arrival time to the second waypoint 302-B of the route 214. As illustrated in the segment probability distribution 400, the trip planning application 212 may determine that there is an estimated 50% cumulative probability that the vehicle 31 will arrive at the traffic control of waypoint 302-B before the traffic control of waypoint 302-B turns red (case A), and an estimated 50% cumulative probability that the vehicle 31 will not arrive before the traffic control of waypoint 302-B turns red (case B).

Figure 5:
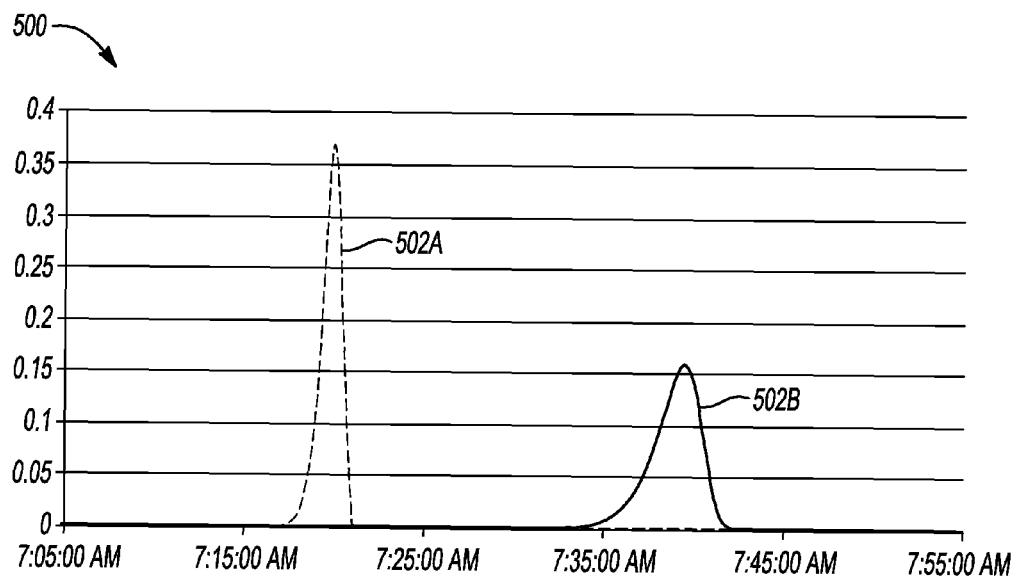
FIG. 5 illustrates an example route probability distribution for arrival time to the destination waypoint of the example route based on the state of the vehicle infrastructure at the second waypoint.

FIG. 5 illustrates an example route probability distribution 500 for arrival time to the destination waypoint 302-R of the example route 214 based on the state of the vehicle infrastructure 204 at the second waypoint 302-B. The trip planning application 212 may be configured to compute alternate estimated times of arrivals 502 to the destination waypoint 302-R of the route 214 based on the different possible cases of traffic control state for the waypoints 302 of the route 214. For example the trip planning application 212 may be configured to compute a first estimated time-of-arrival 502-A based on the vehicle 31 arriving at the traffic control of waypoint 302-B before the traffic control of waypoint 302-B turns red (case A), and a second estimated time-of-arrival 502-B based on the vehicle not arriving before the traffic control of waypoint 302-B turns red (case B).

In an example, if the vehicle 31 arrives at the waypoint 302-B before 7:07 AM, a time at which the traffic control of waypoint 302-B turns red, the vehicle 31 will arrive at the destination waypoint 302-R by 7:20 AM and will be on time (case A). If, however, the traffic control of waypoint 302-B turns red before the vehicle 31 reaches the waypoint 302-B, then the vehicle 31 may wait until the next traffic control cycle, e.g., until 7:10 AM, before the traffic control returns to green. Moreover, because of traffic control synchronization along the route 214 (e.g., light timing), the vehicle 31 may not arrive to the waypoint 302-R until 7:40 AM, and will be late (case B).

It should be noted that the example route probability distribution 500 assumes that there is enough energy in the battery of the vehicle 31 to reach the waypoint 302-R. In many cases, it may be that the battery of the vehicle 31 has a less than 100% probability of having sufficient energy to allow for arrival at the destination of the route 214. In such cases, the distance that the vehicle 31 may be able to travel is controlled to the state of the traffic control of waypoint 302-B upon vehicle 31 arrival at the waypoint 302-B.

Figure 6:
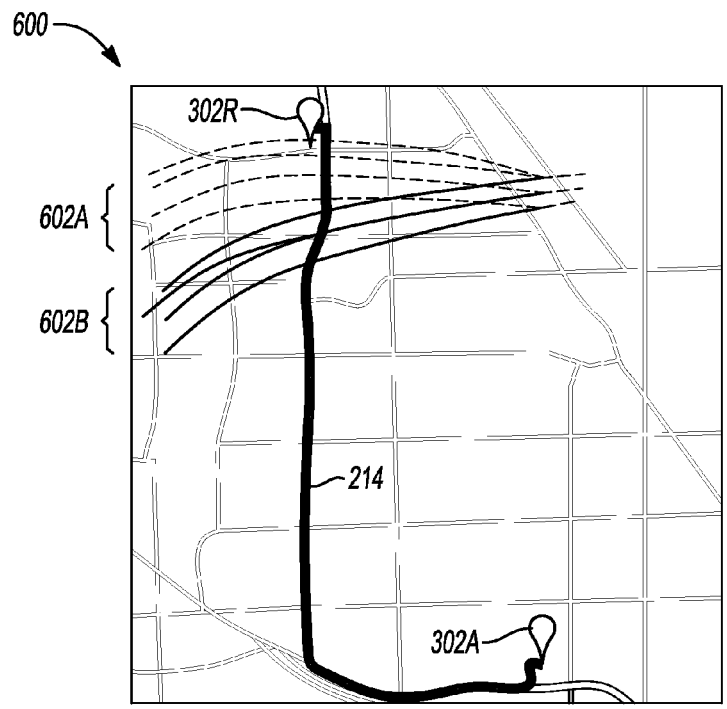
FIG. 6 illustrates example map including multiple set of range contours for the vehicle based on the state of the vehicle infrastructure at the second waypoint.

FIG. 6 illustrates example map 600 including multiple set of range contours 602 for the vehicle 31 based on the state of the vehicle infrastructure 204 at the second waypoint 302-B. The range contours 602 may include information indicative of a probability of the vehicle 31 having sufficient fuel to reach the given points along the range contour 602.

The trip planning application 212 may be configured to compute the range contours 602, for example, based on each of the available traffic control states that may be possible at the expected time-of-arrival determined according to the route probability distribution 500 as well as the expected propulsion and accessory energy usages of the vehicle 31 over the time. The trip planning application 212 may estimate the expected propulsion energy usage according to distance to the destination and information indicative of energy efficiency of the vehicle 31.

As climate control functions may be a primary factor in expected accessory energy usage, the trip planning application 212 may be further configured to estimate accessory energy usage according to likely climate control function usage. The trip planning application 212 may be configured to estimate climate control function usage according to factors such as whether the driver has selected to use heat or air conditioning and ambient temperature, in combination with information indicative of the power draws of the expected climate control functions. Battery energy consumption may continue when the vehicle 31 is at rest and there are accessory loads. Accessory loads may be relatively high when the climate control system is in use as compared to when it is not in use. For this reason travel time is one factor for energy consumption. Similarly, internal combustion engine consumption may continue when the vehicle 31 is at rest and there are accessory loads.

When modeling the range contours 602, the trip planning application 212 may utilize the map data 202 to locate points along the route 214 and on other paths spreading down roads branching away from the route 214. Based on the determined expected energy usage and the available battery or fuel level, the trip planning application 212 may determine the likelihood of the vehicle 31 running out of fuel at the identified points along and adjacent to the route 214. To create the range contours 602, trip planning application 212 may be configured to connect the points on the route 214 and adjacent paths having equal estimated chances of being empty. In an example, the trip planning application 212 may identify range contours 602 where the battery has a 10% chance of being empty, a 20% chance, and so on until a 100% likelihood of empty is reached.

As illustrated, the distribution of time to arrival at the waypoint 302-R is split into multiple discrete sets of range contours 602 based on the state of the traffic control of waypoint 302-B when the vehicle 31 arrives at the waypoint 302-B. Continuing with the example route probability distribution 500 of FIG. 5, the maps 600 include a first set of range contours 602-A for case A where the vehicle 31 arrives at the traffic control of waypoint 302-B before the traffic control of waypoint 302-B turns red, and a second set of range contours 602-B for case B based on the vehicle not arriving before the traffic control of waypoint 302-B turns red. Thus, on urban streets, as range and travel time variability may be dominated by multi-modal traffic controls (e.g., traffic lights, stop signs, train crossings, etc.) more than by other factors, Markov error (e.g., the error caused a small number of long duration discrete events that have a large impact) may be likely to dominate in estimates of vehicle 31 range and travel time. For instance, the continuous distribution function as illustrated in FIG. 4 may be a result of many low impact events.

It should be noted that on a warm day, where it is unnecessary to warm or cool the vehicle, the discrete events may add a Markov process that affects travel time, but has a relatively minimal effect on range. In such a case, the trip planning application 212 may be configured to determine travel time contours instead of or in addition to range contours 602-A. The time contours may accordingly facilitate understanding of the distance the vehicle 31 can travel from its current location in a specified amount of time. As another possibility, due to traffic control and decisions by the driver, etc. a route going up and down a hill or into a headwind may be selected (perhaps to save time) instead of a route that consumes less energy.

Other variations on the trip planning application 212 are possible. As one possibility, the trip planning application 212 may be configured to incorporate the probability of available charging along the route 214 into the route probability distribution 500 and determination of range contours 602. For instance, if the driver arrives at a charging station that is available, then vehicle 31 charge level may be extended as a function of time spent charging. If, upon arrival, the charging station is occupied or otherwise unavailable, then the charge may not be increased. These differences may accordingly translate into differences in distribution of time to arrival as well as in differences in distribution of available vehicle 31 range. Other sources of stochastic noise besides traffic controls or charger availability may cause the range calculation to be multi-modal.

Figure 7A:
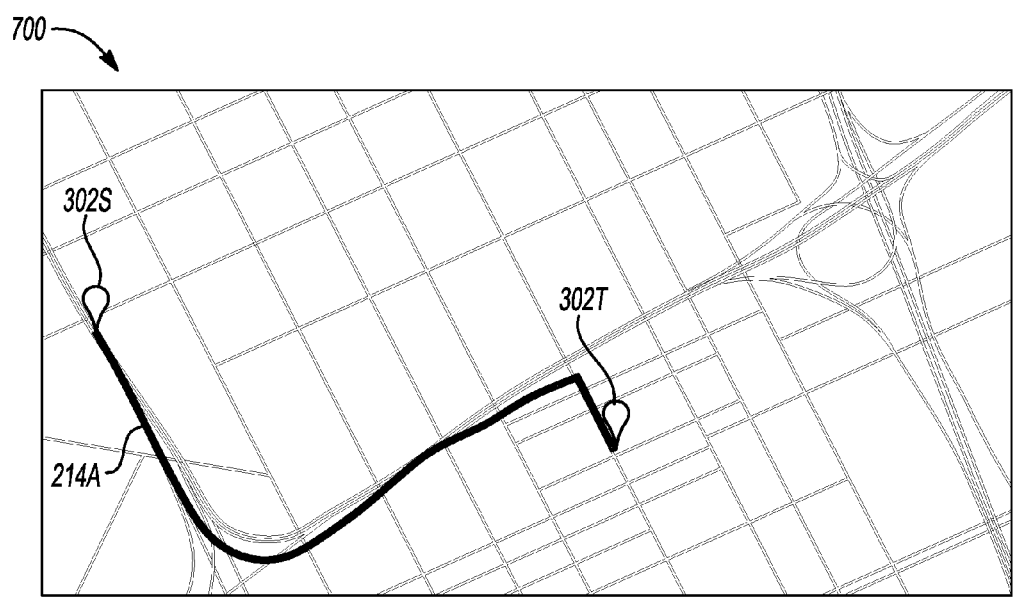
FIGS. 7A and 7B illustrates alternate routes over an example map.
Figure 7B:
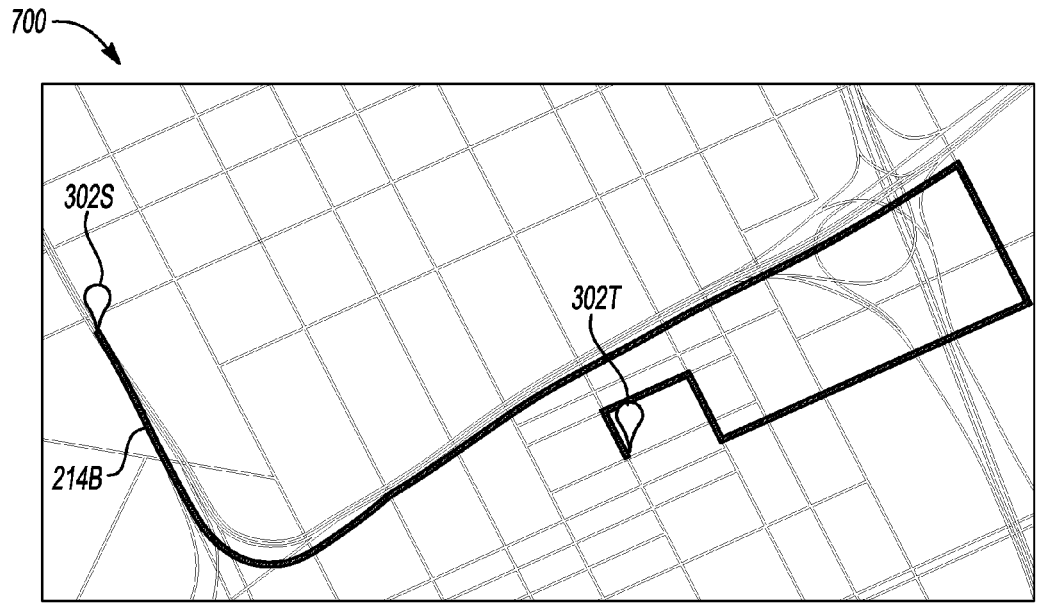

FIGS. 7A and 7B illustrate alternate routes 214-A and 214-B over an example map 700. The route 214-A of FIG. 7A illustrate a relatively energy-efficient path from waypoint 302-S to waypoint 302-T that requires the vehicle 31 to cross three lanes of traffic to exit. If conditions do not provide for such a maneuver to be possible, then as illustrated in FIG. 7B, the vehicle 31 may take the next exit and longer route 214-B from waypoint 302-S to waypoint 302-T.

In the illustrated example, the traffic conditions when the vehicle 31 arrives may or may not allow the vehicle 31 to cross three lanes of traffic. Moreover, the trip planning application 212 may not be able to predict the traffic density at the moment the vehicle 31 vehicle arrives at the crossing until the vehicle is very close to the crossing. As the trip planning application 212 may not be able to determine which route 214-A or 214-B will occur, the trip planning application 212 may instead may utilize a probability (e.g., according to historical vehicle 31 routing or traffic density information) to model the distribution of probabilities of each of the routes 214-A and 214-B. Before the vehicle can make the prediction, the route choice may be considered to be probabilistic (i.e., a 40% change to perform route 214-A, a 60% chance to perform route 214-B, the split potentially based on one or more of traffic density information and historical ability of the vehicle 31 to choose a route 214). After the route choice is made, the contours on the map may collapse to a 100% change of the chosen route 214-A or 214-B, and may be updated to reflect the greater certainly in the route energy/timing to destination.

Figure 8:
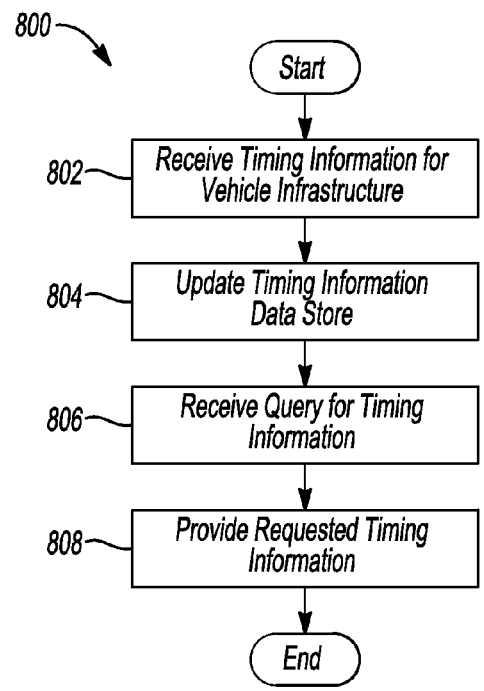
FIG. 8 illustrates an example process for providing timing information regarding vehicle infrastructure.

FIG. 8 illustrates an example process 800 for providing timing information 206 regarding vehicle infrastructure 204. The process 800 may be performed, for example, by the traffic control service 208 in communication with the vehicle infrastructure 204 and the VCS 1 of the vehicle 31.

At operation 802, the traffic control service 208 receives timing information 206 for vehicle infrastructure 204. In an example, the traffic control service 208 and the vehicle infrastructure 204 may generally maintain network connections 210 to receive updated timing information 206, while in another example, the traffic control service 208 and the vehicle infrastructure 204 may form temporary network connections 210 to communicate updated timing information 206, such as on a periodic or polled basis. When connected, the traffic control service 208 may receive the timing information 206 from the vehicle infrastructure 204 over a network connection 210. In another example, the traffic control service 208 may receive timing information 206 from another source, such as via input to the traffic control service 208 from a central traffic authority system from which signal timings are controlled or monitored remotely.

At operation 804, the traffic control service 208 updates the timing information 206 data store. For example, the traffic control service 208 may maintain a data store of received timing information 206, and may update the data store based on the timing information 206 received at operation 802.

At operation 806, the traffic control service 208 receives a query for timing information 206. For example, the trip planning application 212 may query the traffic control service 208 for timing information 206 related to a route 214 that the vehicle 31 is to traverse. The query request my include, for example, a path along the road segments of the map data 202 from a current vehicle 31 location to a location of a POI the driver wishes to reach, and a window of time for which the timing information 206 is being requested.

At operation 808, the traffic control service 208 provides the requested timing information 206 responsive to the request. For example, the traffic control service 208 may retrieve the timing information 206 for the requested locations and times from the data store, and may provide a response to the requesting trip planning application 212 including the requested timing information 206. After operation 808, the process 800 ends.

Figure 9:
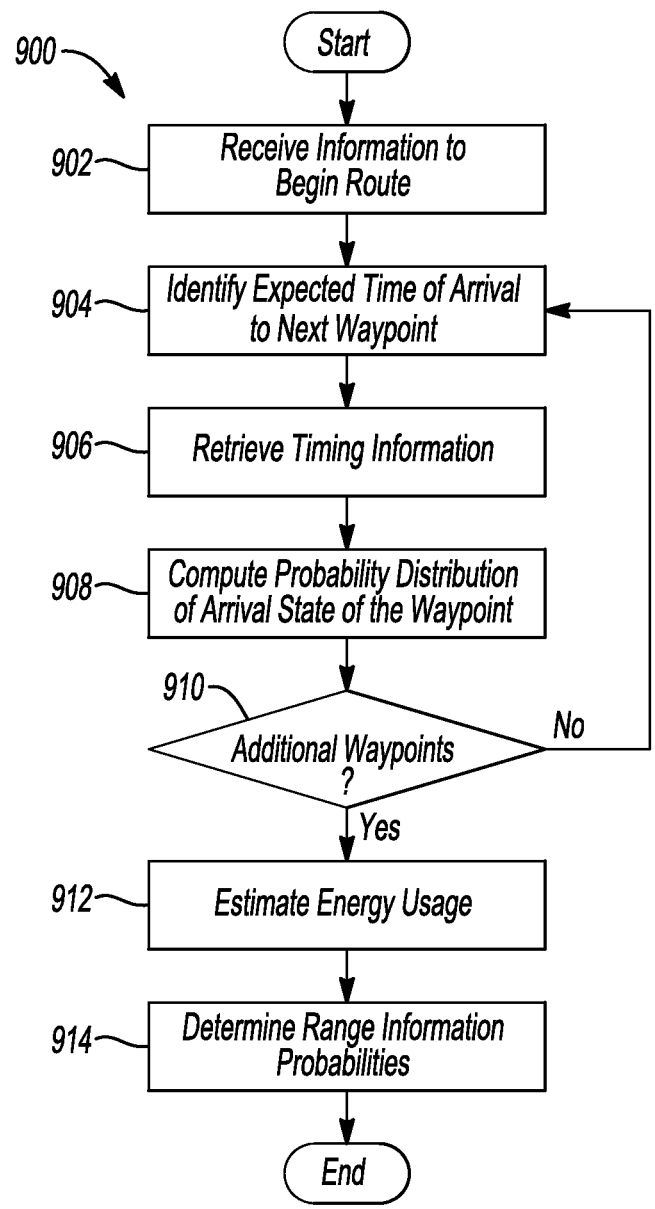
FIG. 9 illustrates an example process for determination of range contours and available vehicle range.

FIG. 9 illustrates an example process 900 for determination of range information probabilities 216. The process 900 may be performed, for example, by the traffic control service 208 in communication with the vehicle infrastructure 204 and the VCS 1 of the vehicle 31. The range information probabilities 216 may be used, for example, for the display of range contours 602 or to update an expected available range of the vehicle 31 along the route 214.

At operation 902, the vehicle 31 receives an indication to begin traversing the route 214. In an example, the trip planning application 212 may receive a driver selection of a navigate-to-destination function from the trip planning application 212. In another example, the trip planning application 212 may receive an indication of the vehicle 31 being placed into gear at a time when the vehicle 31 is historically driven to a particular destination from a particular starting waypoint 302.

At operation 904, the vehicle 31 identifies an expected time-of-arrival to the next waypoint 302 of the route 214. For example, the trip planning application 212 may be configured to compute an estimated time-of-arrival to the next waypoint 302 of the route 214 on factors such as: the time at which the vehicle 31 heads from the current waypoint 302 to the next waypoint 302, speed limits and travel distances along roads to the next waypoint 302 (e.g., as determined based on the map data 202), and historical times taken to reach the next waypoint 302 from the current waypoint 302-A.

At operation 906, the vehicle 31 retrieves timing information 206 for the waypoint 302. For example, the trip planning application 212 may query the traffic control service 208 for timing information 206 related to the route 214 that the vehicle 31 is to traverse.

At operation 908, the vehicle 31 computes the segment probability distribution 400 for arrival time to the waypoint 302 of the route 214. For example, the trip planning application 212 may determine based on the expected time-of-arrival to the next waypoint 302 and the timing information 206, a likelihood for a traffic control at the waypoint 302 to permit the vehicle 31 to proceed (e.g., a green light) or require the vehicle 31 to wait to proceed at a later time (e.g., a red light).

At operation 910, the vehicle 31 determines whether the route 214 includes additional waypoints 302. If so, control passes to operation 904. Otherwise, control passes to operation 912. It should be noted that in some examples, e.g., due to light timing, the expected time-of-arrival to the destination waypoint 302 may be determined based on the timing of the vehicle 31 reaching certain ones of the waypoints 302 (e.g., a first traffic light in a series of timed lights).

At operation 914, the vehicle 31 determines range information probabilities 216. For example, the trip planning application 212 may be configured to determine, based on the energy usage along the route 214 and the route probability distribution 500 for the route 214, sets of range contours 602 for the vehicle 31 based on the expected states of the vehicle infrastructure 204 along the route 214. Based on the likelihoods of the route probability distribution 500, the range contours 602 may be used, for example, to improve the vehicle 31 estimated available vehicle range along the route 214. After operation 912, the process 900 ends.

Thus, the system may be able to identify an expected time-of-arrival distribution to a waypoint 302 along a vehicle route 214, determine energy usage along the route 214 according to a plurality of arrival timing states of a traffic control located at the waypoint 302 given the expected time-of-arrival distribution, update an expected available range of the vehicle 31 along the route 214 and display a map including the vehicle route and range contours 602 indicative of alternative results of arriving at the waypoint 302 at the plurality of arrival states. The system may be useful for battery powered vehicles 31, such as BEVs, where battery life and range are important to the end-user. Also, system may be useful for conventional vehicles 31, where the range aspect may be less relevant, but other aspects, such as carbon credits, reduced fuel consumption and emissions reductions. For instance, the range contours 602 may be applied for use as carbon-credit contours 602 in an example, where the contours 602 indicate the carbon-credit requirements for a route.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to
identify an expected time-of-arrival distribution to a waypoint along a vehicle route,
utilize map data to determine alternate routes branching from the route,
determine energy usage along the route according to a plurality of arrival timing states of a traffic control located at the waypoint given the expected time-of-arrival distribution,
determine energy usage along the alternate routes,
form range contours by connecting points along the route and the alternate routing having substantially equal likelihoods of running out of fuel, the range contours including a first range contour indicating a first likelihood of running out of fuel and a second range contour indicating a second likelihood of running out of fuel greater than the first likelihood, and
display a map including the vehicle route and the range contours indicative of alternative results of arriving at the waypoint at the plurality of arrival states.

2. The system of claim 1, wherein the processor is further configured to:
identify a second expected time-of-arrival distribution to a second waypoint along the vehicle route, and
determine energy usage along the route further according to a second plurality of arrival timing states of a second traffic control located at the second waypoint given the second expected time-of-arrival distribution.

3. The system of claim 1, wherein the waypoint along the route is a traffic light, and the processor is further configured to determine the plurality of arrival timing states according to timing information associated with the traffic light.

4. The system of claim 3, wherein the processor is further configured to query a traffic control service for the timing information.

5. The system of claim 1, wherein the processor is further configured to determine the energy usage according to expected propulsion energy usage and expected accessory energy usage of the vehicle.

6. The system of claim 5, wherein the processor is further configured to estimate accessory energy usage based on climate control user interface input, ambient temperature, and information indicative of power draw of climate control functions.

7. The system of claim 5, wherein the processor is further configured to estimate propulsion energy usage according to distance to a destination of the vehicle route and information indicative of energy efficiency of the vehicle.

8. The system of claim 7, wherein the processor is further configured to estimate propulsion energy usage further according to engine idle time.

9. The system of claim 1, wherein the processor is further configured to display the map in a user interface display of the vehicle.

10. A system comprising:
a processor configured to
compute a probability distribution of a plurality of arrival timing states of a traffic control located at a waypoint along a vehicle route based on an expected time-of-arrival to the waypoint,
utilize map data to determine alternate routes branching from the vehicle route at the waypoint,
determine energy usage along the vehicle route according to the probability distribution, expected propulsion energy usage, and expected accessory energy usage of the vehicle,
determine energy usage along the alternate routes,
form range contours by connecting points along the route and the alternate routing having substantially equal likelihoods of running out of fuel, the range contours including a first range contour indicating a first likelihood of running out of fuel and a second range contour indicating a second likelihood of running out of fuel greater than the first likelihood, and update an expected available range of the vehicle along the route using the determined energy usage along the vehicle route.

11. The system of claim 10, wherein the waypoint along the route is a traffic light, and the processor is further configured to determine the probability distribution of the plurality of arrival timing states according to timing information associated with the traffic light.

12. The system of claim 10, wherein the processor is further configured to estimate accessory energy usage based on climate control user interface input, ambient temperature, and information indicative of power draw of climate control functions.

13. The system of claim 10, wherein the processor is further configured to estimate propulsion energy usage according to distance and information indicative of energy efficiency of the vehicle.

14. A non-transitory computer-readable medium embodying instructions that, when executed by a processor, are configured to cause the processor to:
compute a probability distribution of a plurality of arrival timing states of a traffic control located at a waypoint along a vehicle route based on an expected time-of-arrival to the waypoint,
utilize map data to determine alternate routes branching from the vehicle route at the waypoint,
determine energy usage along the vehicle route according to the probability distribution, expected propulsion energy usage, and expected accessory energy usage of the vehicle,
determine energy usage along the alternate routes,
form range contours by connecting points along the route and the alternate routing having substantially equal likelihoods of running out of fuel, the range contours including a first range contour indicating a first likelihood of running out of fuel and a second range contour indicating a second likelihood of running out of fuel greater than the first likelihood, and
at least one of (i) update an expected available range of the vehicle along the route and (ii) display a map including the vehicle route and the range contours indicative of alternative results of arriving at the waypoint at the plurality of arrival states.

15. The computer-readable medium of claim 14, further embodying instructions configured to cause the processor to:
identify a second waypoint along the route having a second plurality of timing possibilities,
determine the probability distribution of the second plurality of timing possibilities, and
determine the energy usages along the route further according to the second plurality of timing possibilities.

16. The computer-readable medium of claim 14, wherein the waypoint along the route is a traffic light, and the processor is further configured to determine the probability distribution of the plurality of arrival timing states according to timing information associated with the traffic light.

17. The computer-readable medium of claim 16, further embodying instructions configured to cause the processor to query a traffic control service for the timing information.

18. The system of claim 1, wherein the first range contour indicates a 10% likelihood of running out of fuel and the second range contour indicates a 20% likelihood of running out of fuel.

19. The system of claim 10, wherein the first range contour indicates a 10% likelihood of running out of fuel and the second range contour indicates a 20% likelihood of running out of fuel.

20. The computer-readable medium of claim 14, wherein the first range contour indicates a 10% likelihood of running out of fuel and the second range contour indicates a 20% likelihood of running out of fuel.

* * * * *